United States Patent [19]

Davenport

[11] 4,187,936
[45] Feb. 12, 1980

[54] WINCH ASSEMBLY WITH ANTI-FALLBACK CLUTCH

[75] Inventor: Richard G. Davenport, Lowpoint, Ill.

[73] Assignee: Caterpillar Tractor Co., Peoria, Ill.

[21] Appl. No.: 918,233

[22] Filed: Jun. 23, 1978

[51] Int. Cl.² .......................................... F16D 11/04
[52] U.S. Cl. ................................. 192/21; 192/4 C; 192/12 B; 192/48.92; 254/187.4
[58] Field of Search ................... 192/4 C, 12 A, 12 B, 192/12 BA, 21, 51, 48.92; 254/187.1, 187.4, 187.5

[56] References Cited

U.S. PATENT DOCUMENTS

| | | | |
|---|---|---|---|
| 1,743,460 | 1/1930 | Klausmeyer et al. | 192/21 |
| 1,946,177 | 2/1934 | Neurath | 192/21 |
| 3,572,482 | 3/1971 | Kalpas | 192/12 B |
| 3,585,854 | 6/1971 | Versey | 192/12 B |
| 3,729,171 | 4/1973 | Yates et al. | 192/12 A |
| 3,848,852 | 11/1974 | Therkildsen | 254/187.1 |
| 3,915,433 | 10/1975 | Therkildsen | 254/187.1 |
| 4,022,308 | 5/1977 | Hurst | 192/21 |
| 4,088,305 | 5/1978 | Wineburner et al. | 192/12 B |

Primary Examiner—Henry Jaudon
Attorney, Agent, or Firm—Phillips, Moore, Weissenberger, Lempio & Majestic

[57] ABSTRACT

A winch assembly (11) comprises a rotary input shaft (15) connected to a pair of first and second gears (21,22) for rotating the gears in opposite directions. First and second friction clutches (23,24) are adapted to selectively connect a rotary output shaft (20) with the first and second gears, respectively, for establishing a drive connection from the input shaft to the output shaft during the reel-out (RO) and reel-in (RI) modes of operation of the winch assembly. An overrunning one-way clutch (33) is interconnected between the first and second gears for normally permitting the gears to rotate in opposite directions, but will lock-up when a torque load imposed on the output shaft during the reel-in mode of operation exceeds the input torque to the winch assembly by the input shaft.

8 Claims, 4 Drawing Figures

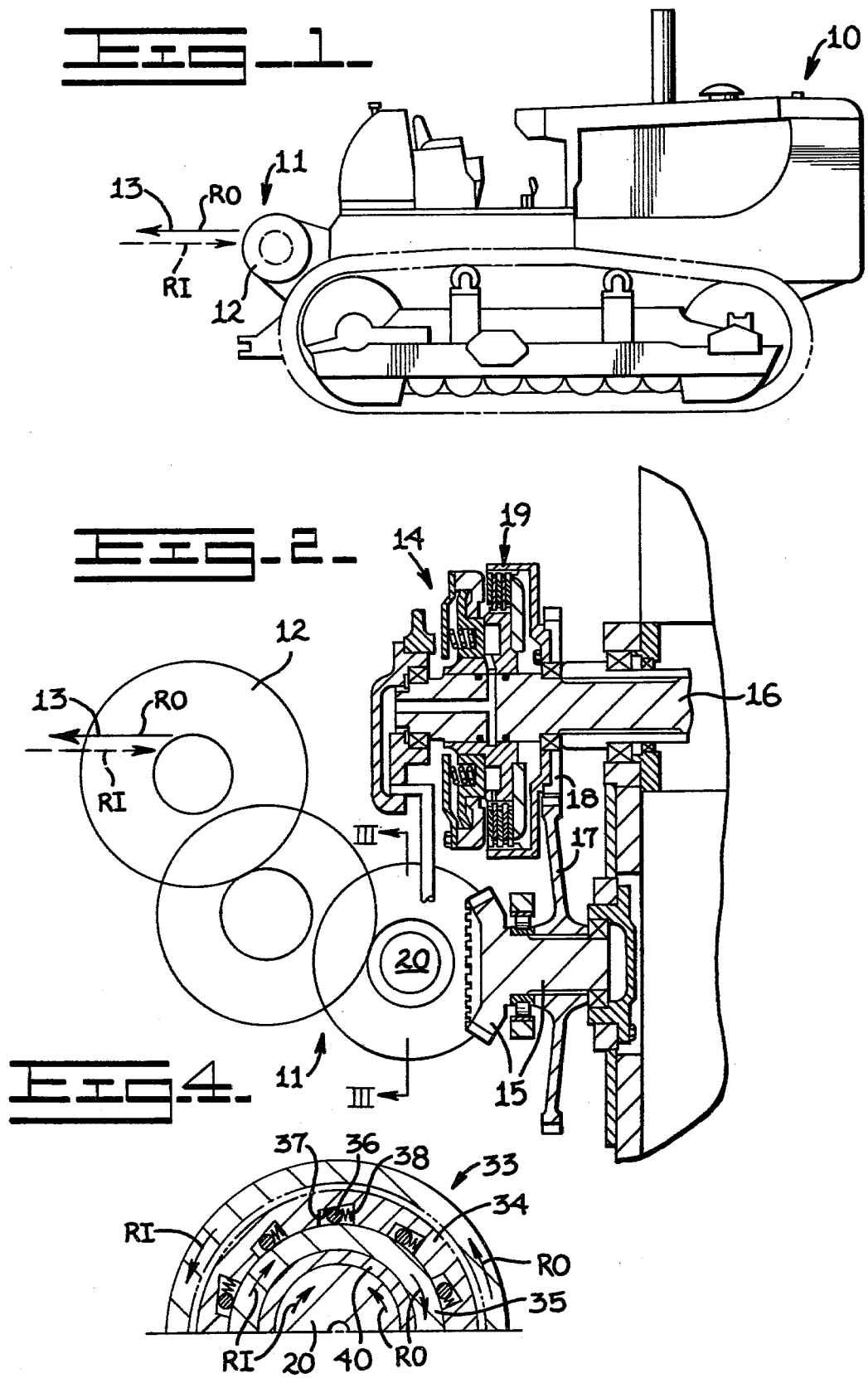

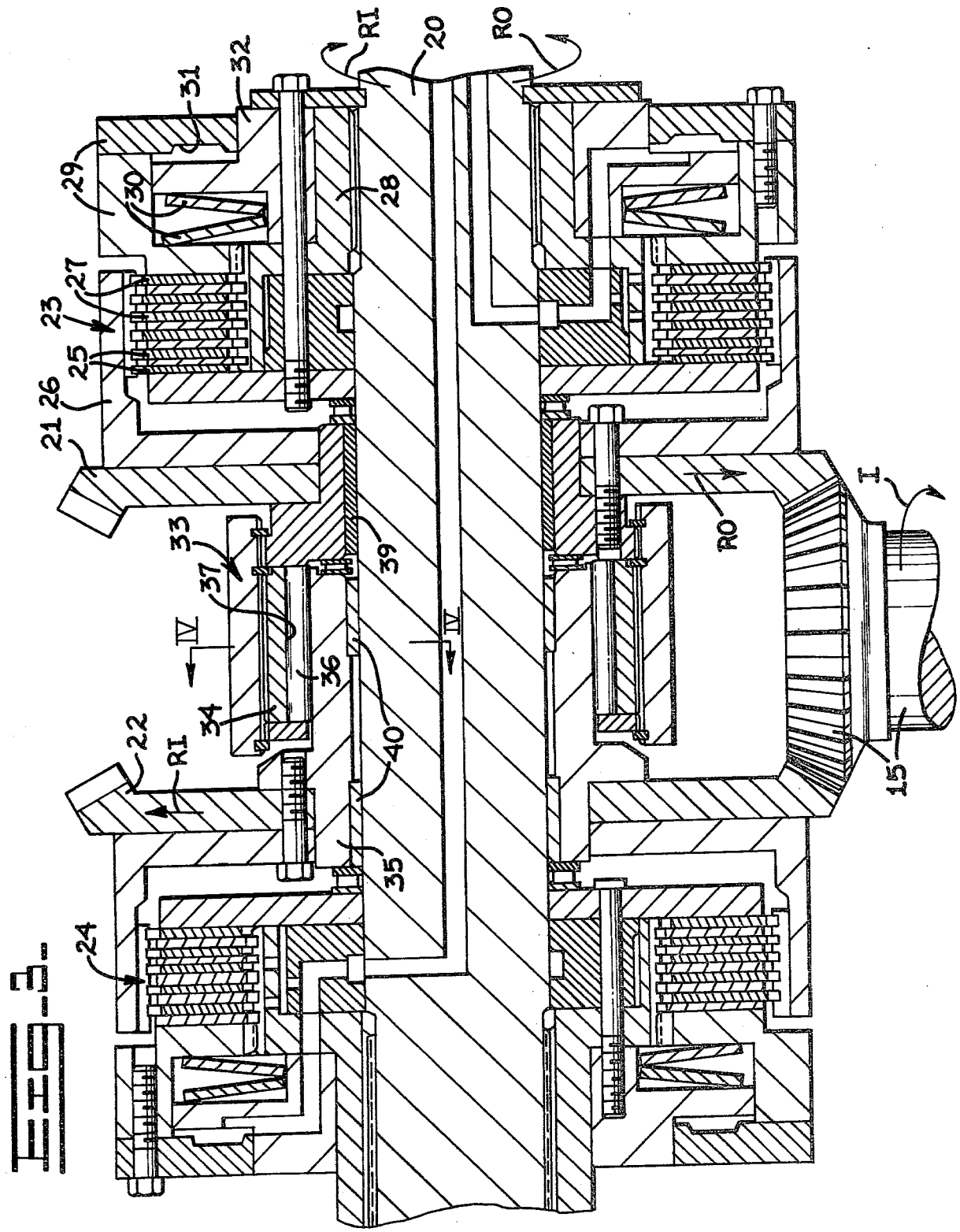

WINCH ASSEMBLY WITH ANTI-FALLBACK CLUTCH

TECHNICAL FIELD

This invention relates to a winch assembly having a one-way clutch incorporated therein to prevent a load from falling back during a reel-in mode of operation of the winch assembly.

BACKGROUND ART

A conventional winch assembly normally comprises a cable drum adapted to reel-out or reel-in a cable entrained thereon. The winch assembly further comprises an engine-driven input shaft which meshes with a pair of axially opposed bevel gears to rotate the gears in opposite directions. A friction clutch is associated with each of the gears whereby actuation of one clutch will establish a driving connection with an output shaft to effect the reel-out operation whereas actuation of the other clutch will establish a drive connection between the other gear and the output shaft to effect the reel-in operation. The output shaft is suitably connected to the cable drum via a transfer gear arrangement.

A common problem with such a conventional winch assembly occurs during the reel-in operation and when the load being reeled-in by the cable drum imposes a torque load on the output shaft which equals or is greater than the torque load imparted to the bevel gear being utilized for the reel-in operation. For example, this condition may occur when engine speed and the torque generated thereby is sufficiently reduced so that the engine cannot apply a sufficient holding torque to the bevel gear to hold or reel-in the load. Likewise, such a condition may arise upon the raising of a suspended load and when engine speed and the torque generated thereby does not provide sufficient power to lift the load.

DISCLOSURE OF THE INVENTION

The present invention is directed to overcoming one or more of the problems as set forth above.

In one aspect of this invention, the winch assembly comprises an input shaft, an output shaft, and a pair of first and second gear means mounted on the output shaft and connected to the input shaft for rotating in opposite directions upon rotation of the input shaft. First and second clutch means are adapted to selectively connect the output shaft to the first and second gear means, respectively, for respectively establishing drive from the input shaft to the output shaft to rotate it in opposite directions. Means, interconnected between the first and second gear means, functions (1) to permit the first and second gear means to rotate in opposite directions when the first clutch means is actuated to rotate the output shaft in a first direction, and (2) to normally permit the first and second gear means to rotate in opposite directions when the second clutch means is actuated to rotate the output shaft in a second direction, but for preventing the first and second gear means from rotating in opposite directions when a torque load is imposed on the output shaft which tends to rotate the output shaft in the first direction with such torque load exceeding the torque load imparted to the input shaft tending to rotate the second gear in the second direction.

The winch assembly of this invention thus overcomes the above-mentioned load fall-back problem by preventing retrograde movement of the output shaft when the torque load imparted to the input shaft falls below a predetermined level.

BRIEF DESCRIPTION OF THE DRAWINGS

Other objects of this invention will become apparent from the following description and accompanying drawings wherein:

FIG. 1 is a side elevational view of a track-type tractor having a winch assembly embodiment of this invention mounted rearwardly thereon;

FIG. 2 schematically illustrates the winch assembly associated with an engine-driven input power train therefor;

FIG. 3 is an enlarged sectional view through the winch assembly, taken in the direction of arrows III—III in FIG. 2; and FIG. 4 is a reduced sectional view through a oneway clutch employed in the winch assembly, taken in the direction of arrows IV—IV in FIG. 3.

BEST MODE FOR CARRYING OUT THE INVENTION

FIG. 1 illustrates a track-type tractor 10 having a winch assembly 11 mounted rearwardly thereon in a conventional manner. The winch assembly comprises a drum 12 rotatably mounted thereon to selectively payout or pay-in a cable 13. As fully described in U.S. Pat. Nos. 3,729,171 issued on Apr. 24, 1973 to Lyle F. Yates et al and 3,915,433 issued on Oct. 28, 1975 to Henry T. Therkildsen, the drum is adapted to be rotated by an engine driven power transmission or take-off 14, (FIG. 2), including a power input shaft and bevel pinion 15 to the winch assembly. The transmission essentially comprises an engine-drive output shaft 16 adapted to rotate shaft 15 via intermeshing gears 17 and 18 upon engagement of a normally disengaged friction or input clutch 19.

Referring to FIG. 3, the winch asembly further comprises a rotary output shaft 20 having a pair of first and second gear means or bevel gears 21 and 22 rotatably mounted thereon. The output shaft is suitably connected to drum 12 via a standard transfer gear arrangement in a conventional manner, as disclosed in the above-referenced U.S. patents, to rotate the drum in opposite directions in response to rotation of the output shaft in opposite directions. Such rotations of the output shaft and drum are effected by selectively connecting identical first and second gears 21 and 22 with the output shaft by first and second friction clutches or clutch means 23 and 24, respectively.

Clutch means 23, for example, comprises a first set of friction discs 25 which are suitably splined to an annular member 26 secured to gear 21 and a second set of friction discs 27 which are suitably splined to an annular member 28, secured to output shaft 20. The respective clutch discs are suitably interleaved to be compressed together and held in a normally engaged condition between a back-up plate suitably secured to output shaft 20 and a two-part piston 29. The piston is urged leftwardly in FIG. 3 to normally compress the discs together by a pair of bevel spring washers 30. An annular actuating chamber 31 is defined between the piston and an annular member 32 secured to output shaft 20 to receive pressurized hydraulic fluid in a conventional manner to urge the piston rightwardly against the opposing biasing forces of spring washers 30 to disengage clutch means 23. Clutch means 24 is constructed to operate in a like manner.

A means 33 is interconnected between first and second gears 21 and 22 for either (1) permitting the first and second gears to rotate in opposite directions when first clutch means 23 is actuated to rotate output shaft 20 in a first direction, or (2) normally permitting the first and second gears to rotate in opposite directions when second clutch means 22 is actuated to rotate the output shaft in a second direction, but for preventing gears 21 and 22 from rotating in opposite directions when a torque load is imposed on output shaft 20 which tends to rotate the output shaft in the first direction and exceeds the torque load imparted on input shaft 15, tending to rotate gear 22 in the second direction.

Referring to FIGS. 3 and 4, means 33 preferably comprises a conventional overrunning one-way clutch, including an outer race 34 suitably secured to gear 21, an inner race 35 suitably secured to gear 22, and a plurality of rollers 36 each disposed in a recess 37. As shown in FIG. 4, the depth of each recess increases in a clockwise direction whereby clockwise movement of inner race 35 relative to outer race 34 will permit free-wheeling of the clutch whereas counterclockwise movement of the inner race relative to the outer race will frictionally engage rollers 36 therebetween. A spring 38 is disposed in each recess 37 to urge a respective roller 36 towards the narrow end of the recess.

It should be further noted that outer race 34 of the clutch is rotatably mounted on output shaft 20 by a sleeve bearing 39 whereas inner race 35 is rotatably mounted on the output shaft by a pair of axially spaced sleeve bearings 40. Upon release of clutches 23 and 24 by suitable control means, gear 21 will rotate freely in a counterclockwise direction RO (as viewed from the right side of gear 21) and gear 22 will rotate freely in an opposite clockwise direction RI on the output shaft. During this condition of operation, when drum 12 is enabled to freely pay-out the cable therefrom, clutch 33 is maintained in a free-wheeling state. As described hereinafter, such a free-wheeling state of the one-way clutch will also occur during the reel-out operation and will normally occur during the reel-in operation, the sole exception being during the reel-in operation when a torque load of sufficient magnitude is imposed on output shaft 20 to overcome the input torque of input shaft 15 whereby the one-way clutch will function to "lock-up" gears 21 and 22 to prevent a load carried by the cable from falling backwardly.

INDUSTRIAL APPLICABILITY

In operation, of track-type tractor 10, for example, input clutch 19 is normally maintained in its disengaged condition of operation whereby no power input is transmitted to winch assembly 11 via input shaft 15. During this condition of operation, clutches 23 and 24 will normally remain engaged to prevent rotation of drum 12 (FIG. 2). However, the operator is at liberty to pressurize actuating chambers 31 of the clutches to disengage them to reel-out cable from the drum by hand.

During the powered reel-out mode of operation, input clutch 19 and clutch 23 are engaged. Rotation of input shaft 15 in direction I (FIG. 3) will, in turn, rotate gear 21 counterclockwise (as viewed from the right-hand side of gear 21 in FIG. 3) in the direction RO. Simultaneously therewith, gear 22 will rotate in an opposite direction RI, but will have no effect on the rotation of output shaft 20 since clutch 24 remains disengaged. However, engagement of clutch 23 will permit gear 21 to rotate output shaft 20 counterclockwise in FIG. 2, as indicated by arrow RO.

Referring to FIG. 4, counterclockwise rotation of outer race 34 of clutch 33 in a first direction and simultaneous rotation of inner race 35 in a clockwise second direction will cause each roller 36 to be urged towards the wider end of a respective recess 37 whereby the clutch will remain in an over-running condition of operation. This overrunning condition, whereby gear 22 freely rotates on output shaft 20, will continue throughout the reel-out mode of winch assembly operation since no reverse load is normally imposed on cable 13 (FIG. 2).

During a normal reel-in operation whereby cable drum 12 is rotated in a clockwise direction in FIG. 2 to payin cable 13 in response to engagement of clutches 19 and 24 (with clutch 23 being disengaged), gears 21 and 22 will rotate in the same opposite directions. However, since gear 22 is powered to rotate in direction RI along with output shaft 20, as viewed from the right-hand side of the gear in FIG. 3, the output shaft will thus rotate in an opposite direction to reel-in the cable. During the reel-in operation, should a load of substantially high magnitude be imposed on cable 13 to apply a torque to cable drum 12 and thus output shaft 20 which is greater than the torque load imparted to gear 22 by input shaft 15, clutch 33 will engage to lock-up the winch assembly to prevent the load from falling backwardly.

This condition of operation may occur, for example, when engine speed has been sufficiently reduced to provide inadequate torque to gear 22 to hold the load. Referring to FIG. 4, wherein normal rotations of output shaft 20, outer race 34 and inner race 35 of the clutch are depicted by arrows RI and RO, a torque overload on output shaft 20 will function to urge inner race 35 into a counter rotating or counterclockwise direction in FIG. 4. Since freewheeling gear 21 must rotate in an opposite direction relative to the rotational direction of gear 22 due to the common meshing at the pinion of input shaft 15, rollers 36 will be frictionally urged by races 34 and 35 of clutch 33 into the narrower ends of recesses 37. The clutch will thus lock-up to hold the load connected to cable 13 (FIG. 2) until engine speed is raised to a sufficient level to apply sufficient torque to gear 22 to overcome the counter-acting torque imposed on output shaft 20. The winch assembly will then be enabled to assume its normal reel-in operation whereby output shaft 20, gear 22 and inner and outer races 34 and 35 of clutch 33 will assume the directional rotations depicted by arrows RI in FIG. 4.

From the above description it can be seen that clutch 33 provides a relatively non-complex and economical solution to a bothersome problem normally encountered by a winch assembly during the reel-in mode of operation thereof. Furthermore, the disposition of the clutch centrally between gears 21 and 22 provides a very compact arrangement which facilitates expeditious assembly and disassembly for servicing purposes. Although a specific one-way clutch, including rollers 36, will provide the desired functions as described above, it should be understood that other types of clutches, such as a sprag type, could be used in lieu thereof.

Other aspects, objects and advantages of this invention can be obtained from a study of the drawings, the disclosure and the appended claims.

What is claimed is:

1. A winch assembly (11) comprising:

a rotary input shaft (15),
a rotary output shaft (20),
a pair of first (21) and second (22) gear means rotatably mounted on said output shaft and connected to said input shaft for rotating in first and second opposite directions, respectively, upon rotation of said input shaft,
first (23) and second (24) clutch means for selectively connecting said output shaft to said first and second gear means, respectively, for establishing drive from said input shaft to said output shaft to rotate said output shaft in said first or second direction, respectively, and
means (33) interconnected between said first and second gear means (1) for permitting said first and second gear means to rotate in said opposite directions when said first clutch means is actuated to rotate said output shaft in said first direction, and (2) for normally permitting said first and second gear means to rotate in said opposite directions when said second clutch means is actuated to rotate said output shaft in said second direction, but for preventing said first and second gear means from rotating in said opposite directions when a torque load imposed on said output shaft tending to rotate said output shaft in said first direction exceeds a torque load imposed on said input shaft tending to rotate said second gear means in said second direction.

2. The winch assembly of claim 1 wherein said rotary input shaft has a pinion (15) secured thereon and wherein said pair of first and second gear means comprise bevel gears (21,22) meshing with said pinion whereby rotation of said pinion rotates said bevel gears in opposite directions.

3. The winch assembly of claim 1 wherein each of said first and second clutch means comprise means (30) for normally engaging such clutch means and further means (31) for selectively disengaging such clutch means.

4. The winch assembly of claim 1, 2 or 3 wherein said means interconnected between said first and second gear means comprises an overrunning one-way clutch (33).

5. The winch assembly of claim 4 wherein said one-way clutch is disposed axially between said first and second gear means.

6. The winch assembly of claim 5 wherein said one-way clutch comprises an outer race (34) secured to said first gear means and an inner race (35) secured to said second gear means.

7. The winch assembly of claim 6 wherein a plurality of circumferentally disposed recesses (37) are formed internally on said outer race and wherein a roller (36) is disposed in each of said recesses for wedging between said inner and outer races when said inner race rotates in one direction relative to said outer race.

8. The winch assembly of claim 6 further comprising bearing means (39,40) rotatably mounting each of said inner and outer races on said output shaft.

* * * * *